(12) United States Patent
Coulomb

(10) Patent No.: US 11,519,811 B2
(45) Date of Patent: Dec. 6, 2022

(54) LEAK DETECTOR AND LEAK DETECTION METHOD FOR LEAK-TESTING OBJECTS

(71) Applicant: PFEIFFER VACUUM, Annecy (FR)

(72) Inventor: Julien Coulomb, Saint Pierre en Faucigny (FR)

(73) Assignee: PFEIFFER VACUUM, Annecy (FR)

( * ) Notice: Subject to any disclaimer, the term of this patent is extended or adjusted under 35 U.S.C. 154(b) by 429 days.

(21) Appl. No.: 16/642,295

(22) PCT Filed: Aug. 23, 2018

(86) PCT No.: PCT/EP2018/072818
§ 371 (c)(1),
(2) Date: Feb. 26, 2020

(87) PCT Pub. No.: WO2019/042868
PCT Pub. Date: Mar. 7, 2019

(65) Prior Publication Data
US 2020/0200641 A1 Jun. 25, 2020

(30) Foreign Application Priority Data
Aug. 29, 2017 (FR) ...................................... 1757935

(51) Int. Cl.
*G01M 3/20* (2006.01)
*F04C 25/02* (2006.01)
(Continued)

(52) U.S. Cl.
CPC ............ *G01M 3/202* (2013.01); *F04C 25/02* (2013.01); *F04C 28/28* (2013.01); *G01M 3/205* (2013.01);
(Continued)

(58) Field of Classification Search
CPC ........ G01M 3/205; G01M 3/202; G01M 3/20; G01M 3/02
See application file for complete search history.

(56) References Cited

U.S. PATENT DOCUMENTS 4,487,058 A * 12/1984 Mennenga ............ G01M 3/226
73/40
4,735,084 A * 4/1988 Fruzzetti ............... G01M 3/202
73/40.7
(Continued)

FOREIGN PATENT DOCUMENTS

CN 103403354 A 11/2013
DE 691 04 005 T2 1/1995
(Continued)

OTHER PUBLICATIONS

Combined Chinese Office Action and Search Report dated Aug. 4, 2021 in Chinese Patent Application No. 201880055843.8 ( with English translation of Category of Cited Documents), 8 pages.
(Continued)

*Primary Examiner* — David A. Rogers
(74) *Attorney, Agent, or Firm* — Oblon, McClelland, Maier & Neustadt, L.L.P.

(57) ABSTRACT

A leak detector is provided for leak-testing objects that are to be tested by spraying tracer gas, the leak detector including: a detection inlet configured to be connected to an object that is to be tested; a pumping device including a vacuum line connected to the detection inlet, a rough-vacuum pump connected to the vacuum line, and a turbomolecular vacuum pump connected to the vacuum line, a delivery of which is connected to the rough-vacuum pump; and a gas detector connected to the turbomolecular vacuum pump, the pumping device further including an ancillary pump connected to the rough-vacuum pump and being configured to lower an ultimate-vacuum pressure of tracer gas in the rough-vacuum (Continued)

pump. A leak detection method for leak-testing objects that are to be tested by spraying tracer gas is also provided.

15 Claims, 2 Drawing Sheets

(51) Int. Cl.
*F04C 28/28* (2006.01)
*F04D 19/04* (2006.01)
*F04C 23/00* (2006.01)

(52) U.S. Cl.
CPC ........ *F04C 23/005* (2013.01); *F04C 2220/10* (2013.01); *F04C 2270/585* (2013.01); *F04C 2270/80* (2013.01); *F04D 19/042* (2013.01)

(56) References Cited

U.S. PATENT DOCUMENTS

| | | | | |
|---|---|---|---|---|
| 4,779,449 A * | 10/1988 | Bley | ............... | G01M 3/229 |
| | | | | 73/40.7 |
| 5,107,697 A * | 4/1992 | Tallon | ............... | G01M 3/202 |
| | | | | 73/40.7 |
| 5,226,314 A | 7/1993 | Baret | | |
| 5,297,422 A | 3/1994 | Baret | | |
| 5,341,671 A * | 8/1994 | Baret | ............... | G01M 3/202 |
| | | | | 73/40.7 |
| 5,561,240 A * | 10/1996 | Ochiai | ............... | F04D 19/04 |
| | | | | 73/40 |
| 5,880,357 A * | 3/1999 | Bohm | ............... | G01M 3/202 |
| | | | | 73/40.7 |
| 5,900,537 A * | 5/1999 | Bohm | ............... | G01M 3/202 |
| | | | | 73/40.7 |
| 5,932,797 A * | 8/1999 | Myneni | ............... | G01M 3/20 |
| | | | | 73/40.7 |
| 6,282,946 B1 * | 9/2001 | Gevaud | ............... | G01M 3/202 |
| | | | | 73/40.7 |
| 6,286,362 B1 * | 9/2001 | Coffman | ............... | G01M 3/202 |
| | | | | 73/40.7 |
| 7,033,142 B2 * | 4/2006 | Conrad | ............... | F04D 25/00 |
| | | | | 417/205 |
| 7,082,813 B2 * | 8/2006 | Grosse-Bley | ............... | G01M 3/202 |
| | | | | 73/40.7 |
| 7,204,127 B2 * | 4/2007 | Perkins | ............... | G01M 3/202 |
| | | | | 73/40 |
| 7,240,536 B2 * | 7/2007 | Beyer | ............... | F04D 27/00 |
| | | | | 73/40 |
| 7,600,989 B2 * | 10/2009 | Bohm | ............... | G01M 3/205 |
| | | | | 417/423.4 |
| 7,717,681 B2 * | 5/2010 | Bohm | ............... | G01M 3/202 |
| | | | | 73/40.7 |
| 8,171,773 B2 * | 5/2012 | Wetzig | ............... | G01M 3/202 |
| | | | | 73/40.7 |
| 8,176,770 B2 * | 5/2012 | Wetzig | ............... | G01M 3/205 |
| | | | | 73/40.7 |
| 8,915,122 B2 * | 12/2014 | Wetzig | ............... | G01M 3/205 |
| | | | | 73/40.7 |
| 9,316,559 B2 * | 4/2016 | Döbler | ............... | F04D 27/0269 |
| 9,632,067 B2 * | 4/2017 | Wetzig | ............... | G01N 25/20 |
| 9,841,342 B2 * | 12/2017 | Walter | ............... | G01M 3/02 |
| 11,009,030 B2 * | 5/2021 | Grosse Bley | ............... | F04D 29/104 |
| 2005/0066708 A1 * | 3/2005 | Grosse-Bley | ............... | G01M 3/202 |
| | | | | 73/40.7 |
| 2013/0186183 A1 | 7/2013 | Doebler | | |
| 2014/0294605 A1 | 10/2014 | Ingles et al. | | |
| 2018/0328809 A1 * | 11/2018 | Bruhns | ............... | G01M 3/205 |
| 2020/0319053 A1 * | 10/2020 | Coulomb | ............... | F04D 25/16 |

FOREIGN PATENT DOCUMENTS

| | | |
|---|---|---|
| DE | 692 02 951 T2 | 11/1995 |
| DE | 10 2010 033 373 A1 | 2/2012 |
| JP | H-0815078 A | 1/1996 |

OTHER PUBLICATIONS

Combined Chinese Office Action and Search Report dated May 12, 2022 in Chinese Patent Application No. 201880055843.8, 12 pages.
International Search Report dated Oct. 9, 2018 in PCT/EP2018/072818 filed on Aug. 23, 2018, 2 pages.
Japanese Office Action dated Jul. 5, 2022 in Japanese Patent Application No. 2020-512547 (with English translation), 11 pages.

* cited by examiner

LEAK DETECTOR AND LEAK DETECTION METHOD FOR LEAK-TESTING OBJECTS

The present invention relates to a leak detector and to a method for detecting leaks in order to leak-test objects that are to be tested using the so-called "spraying" technique in which a tracer gas is sprayed.

The technique of detecting leaks by spraying involves evacuating the gas from inside the object that is to be tested, down to a low pressure. A tracer-gas-enriched atmosphere is then created around the object by spraying. The inside of the object that is to be tested is connected to a leak detector which verifies whether the tracer gas can be found among the aspirated gases.

This method involves detecting the passage of the tracer gas through any leaks there might be in the object that is to be tested. Helium or hydrogen are generally used as tracer gas because these gases pass more easily through small leaks than do other gases, because of their small molecule size and because of the high speeds at which they travel.

This method is generally highly sensitive.

However, in order to avoid errors, to increase the precision and rate of measurements, notably by reducing the waiting time between two measurements, the tracer gas background noise needs to be brought down as low as possible quickly.

One solution is to increase the pumping capability of the leak detector. However, that entails the use of expensive and bulky pumping devices.

It is one of the objects of the present invention to propose a leak detector that is lightweight, compact and inexpensive, and makes it possible to obtain a low background noise of tracer gas.

To this end, one subject of the invention is a leak detector for leak-testing objects that are to be tested by spraying tracer gas, the leak detector comprising:
  a detection inlet intended to be connected to an object that is to be tested,
  a pumping device comprising:
    a vacuum line connected to the detection inlet,
    a rough-vacuum pump connected to the vacuum line, and
    a turbomolecular vacuum pump connected to the vacuum line and the delivery of which is connected to the rough-vacuum pump,
  a gas detector connected to the turbomolecular vacuum pump,
characterized in that the pumping device comprises an ancillary pumping means connected to the rough-vacuum pump to lower the ultimate-vacuum pressure of tracer gas in the rough-vacuum pump.

By lowering the ultimate-vacuum pressure in the rough-vacuum pump, the background noise of helium or hydrogen tracer gas in the gas detector is lowered. Reducing the tracer gas background noise makes it possible to increase the sensitivity for the detection of leaks, notably by around 30%. Furthermore, the ability to obtain a low background noise means that the leak detector can quickly become operational after the detection of a large leak, making it possible to reduce the waiting time between two detections.

The ancillary pumping means also makes it possible to lengthen the life of the rough-vacuum pump by making it more robust towards condensable species.

The lowering of the pressure in the rough-vacuum pump also makes it possible to lower the noise level of the rough-vacuum pump significantly and to reduce its electrical power consumption.

According to one or more features of the leak detector, considered alone or in combination:
  the leak detector comprises a pressure sensor configured to measure the pressure in the vacuum line,
  the leak detector comprises a control unit connected to the pressure sensor,
  the pumping device comprises an ultimate-vacuum electrically-operated valve controllable by the control unit, the ultimate-vacuum electrically-operated valve connecting the ancillary pumping means to the rough-vacuum pump,
  the control unit is configured to command the opening of the ultimate-vacuum electrically-operated valve when the pressure measured by the pressure sensor is below or equal to a low-pressure threshold,
  the rough-vacuum pump comprises a plurality of pumping stages mounted in series,
  the ancillary pumping means is connected to an inter-stage canal of the rough-vacuum pump,
  the inter-stage canal connects the penultimate pumping stage of the rough-vacuum pump to the last pumping stage of the rough-vacuum pump,
  the leak detector comprises a purge device connected as a bypass of the ultimate-vacuum electrically-operated valve on the inter-stage canal,
  the ancillary pumping means is connected to the delivery of the rough-vacuum pump,
  the ancillary pumping means comprises at least one ancillary pump, such as a diaphragm pump,
  the ancillary pumping means comprises a vacuum reservoir, an ultimate-vacuum electrically-operated valve interposed between the vacuum reservoir and the rough-vacuum pump and a vacuum-creating electrically-operated valve interposed between the vacuum reservoir and the intake of the rough-vacuum pump, the ultimate-vacuum electrically-operated valve and vacuum-creating electrically-operated valve being controllable by a control unit of the leak detector.

Another subject of the invention is a leak detection method for leak-testing objects that are to be tested by spraying tracer gas, which is implemented in a leak detector as described hereinabove, wherein the ultimate-vacuum pressure of tracer gas in the rough-vacuum pump is lowered using the ancillary pumping means.

The leak detection method can be fully automated.

According to one or more features of the leak detection method, considered alone or in combination:
  the opening of an ultimate-vacuum electrically-operated valve connecting the ancillary pumping means to the rough-vacuum pump is commanded in order to lower the ultimate-vacuum pressure of tracer gas in the rough-vacuum pump using the ancillary pumping means when the pressure measured in the vacuum line is below or equal to a low-pressure threshold below or equal to 100 Pa, such as of the order of 50 Pa,
  upon the start-up of the leak detector the pressure in the vacuum line is lowered using the rough-vacuum pump and using an ancillary pump of the ancillary pumping means,
  the rotational speed of the rough-vacuum pump is reduced when the leak detector is not used for a period of time longer than a predefined period and the opening of the ultimate-vacuum electrically-operated valve is commanded,
  the ultimate-vacuum pressure in the rough-vacuum pump is lowered using the ancillary pumping means for a predefined period of time after the overall supply to the leak detector is cut off, a supply being furnished by a battery of the leak detector or by a kinetic energy recovery means of the leak detector able to recover the kinetic energy of rotation of the rotor of the turbomolecular vacuum pump in the form of electrical energy.

Further advantages and features will become apparent from reading the following description of one particular, but nonlimiting, embodiment of the invention, and from studying the attached drawings in which.

In these figures, elements that are identical bear the same reference numerals.

The following embodiments are examples. Although the description refers to one or more embodiments, that does not necessarily mean that each reference relates to the same embodiment or that the features apply uniquely to one single embodiment. Simple individual features of various embodiments may also be combined or interchanged to form other embodiments.

A positive displacement vacuum pump which aspirates, transfers and then delivers the gas that is to be pumped at atmospheric pressure is defined as being a rough-vacuum pump.

What is meant by "upstream" is an element which is positioned before another with respect to the direction of circulation of the gas. By contrast, what is meant by "downstream" is an element placed after another with respect to the direction of circulation of the gas that is to be pumped, the element situated upstream being at a lower pressure than the element situated downstream.

An "ultimate-vacuum" is defined as being the minimum pressure obtained by the rough-vacuum pump when no gas flow is introduced, except for any potential unwanted and negligible flows of gas.

Figure 1:
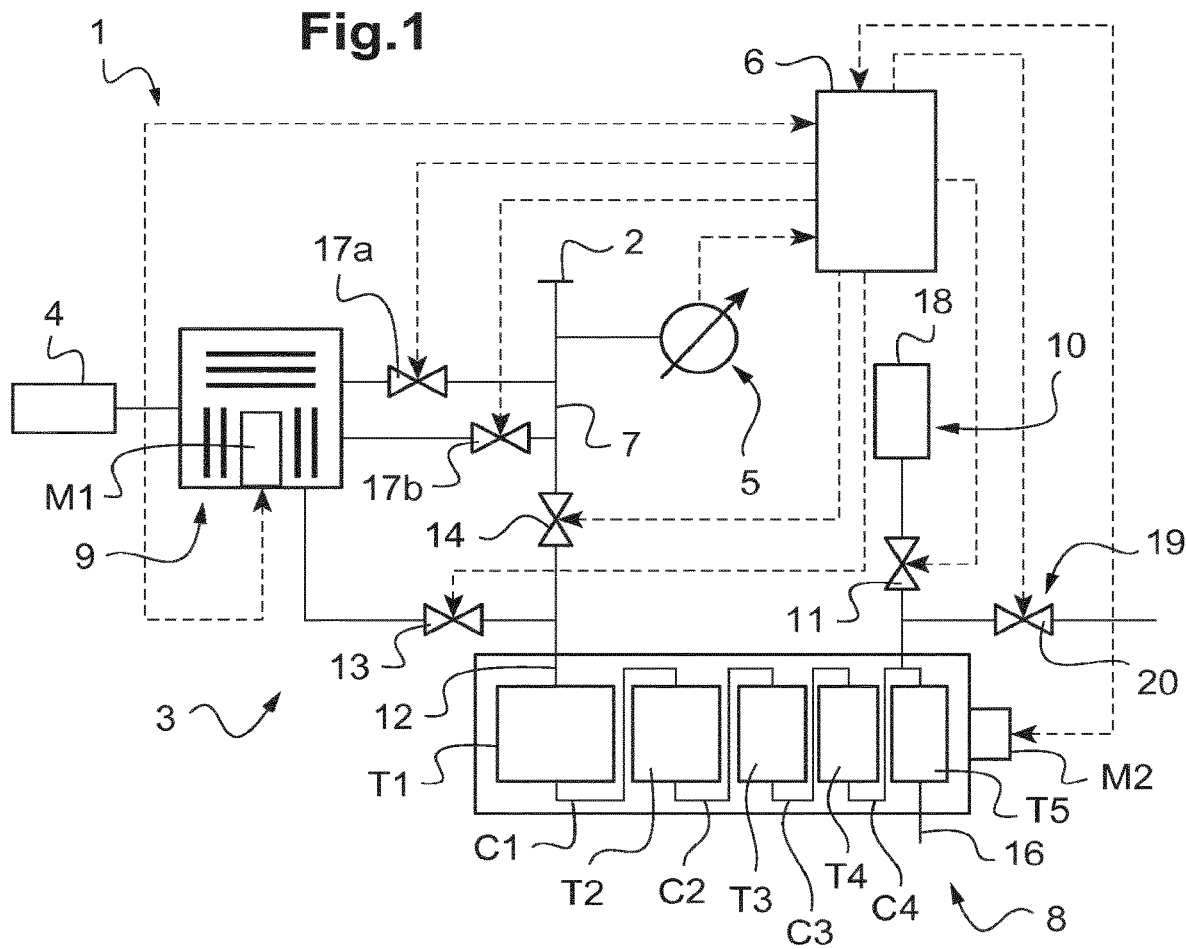
FIG. 1 depicts a schematic view of a leak detector according to a first embodiment example.

FIG. 1 shows a leak detector 1 for leak-testing objects that are to be tested by spraying tracer gas.

The leak detector 1 comprises a detection inlet 2 intended to be connected to an object that is to be tested, a pumping device 3, a gas detector 4, a pressure sensor 5 and a control unit 6 connected to the pressure sensor 5.

The pumping device 3 comprises a vacuum line 7 connected to the detection inlet 2, a rough-vacuum pump connected to the vacuum line 7, a turbomolecular vacuum pump 9 connected to the vacuum line 7 and an ancillary pumping means 10. The pumping device 3 may further comprise an ultimate-vacuum electrically-operated valve 11 controllable by the control unit 6, the ultimate-vacuum electrically-operated valve 11 connecting the ancillary pumping means 10 to the rough-vacuum pump 8.

The turbomolecular vacuum pump 9 comprises a rotor, a stator and a motor M1. The rotor is driven in rotation in the stator by the motor M1 when the motor M1 is supplied by the overall supply of the leak detector 1.

The gas detector 4 is connected to the turbomolecular vacuum pump 9, for example to the intake thereof. The gas detector 4 comprises, for example, a mass spectrometer.

The delivery of the turbomolecular vacuum pump 9 is connected to the intake 12 of the rough-vacuum pump 8 via a first electrically-operated isolation valve 13 of the pumping device 3. The first electrically-operated isolation valve 13 is controllable by the control unit 6.

The intake 12 of the rough-vacuum pump 8 is also connected to the detection inlet 2 via a second electrically-operated isolation valve 14 of the pumping device 3, controllable by the control unit 6. More specifically, the delivery of the turbomolecular vacuum pump 9 is connected via the first electrically-operated isolation valve 13 between the second electrically-operated isolation valve 14 and the intake 12 of the rough-vacuum pump 8.

The second electrically-operated isolation valve 14 allows the vacuum line 7 of the leak detector 1 to be pre-evacuated.

The rough-vacuum pump 8 comprises a plurality of pumping stages T1-T5 mounted in series one after the other, for example five stages, between the intake 12 and a delivery 16 of the pump 8 and through which a gas that is to be pumped can circulate.

Each pumping stage T1-T5 comprises a respective inlet and outlet. The successive pumping stages T1-T5 are connected in series one after the other by respective inter-stage canals C1-C4 connecting the outlet (or the delivery) of the preceding pumping stage to the inlet (or intake) of the stage which follows. The stators of the pumping stages T1-T5 form a body of the rough-vacuum pump 8. The pressure at the delivery 16 of the rough-vacuum pump 8 is atmospheric pressure. The rough-vacuum pump 8 further comprises a nonreturn valve at the outlet of the final pumping stage T5, to prevent the pumped gases from returning to the vacuum pump 8. The pumping stages T1-T5 have a swept volume, namely a volume of pumped gas, that is decreasing (or equal) with the pumping stages, the first pumping stage T1 having the highest swept-volume output and the final pumping stage T5 having the smallest swept-volume output. The rough-vacuum pump 8 has, for example, a pumping capability of between 20 $m^3/h$ and 50 $m^3/h$, such as of the order of 40 $m^3/h$.

According to one embodiment example, the rough-vacuum pump 8 comprises two rotary lobed rotors extending into the pumping stages T1-T5. The shafts of the rotors are driven by a motor M2 of the rough-vacuum pump 8 when the motor M2 is supplied via the overall power supply of the leak detector 1. The rotors have lobes with identical profiles, such as of the "roots" type ("figure-eight" or "kidney bean" shaped cross sections). The rotors are angularly offset and driven so that they rotate synchronously in opposite directions within each stage T1-T5. As they rotate, the gas drawn in from the intake 12 is trapped in the volume generated by the rotors and the stator and is then driven by the rotors toward the next stage. The rough-vacuum pump 8 is said to be "dry" because, during operation, the rotors rotate inside the stator without any mechanical contact with the stator, thereby allowing a complete absence of oil in the pumping stages T1-T5.

Of course, the invention also applies to other types of multi-stage rough-vacuum pumps, such as those of the "claw" type or those of the "scroll" type, or those of a screw type or working on another similar positive-displacement pump principle or such as a multi-stage diaphragm-type rough-vacuum pump.

The detection inlet 2 of the leak detector 1 is connected to an intermediate stage of the turbomolecular vacuum pump 9 via at least one electrically-operated sampling valve 17a, 17b controllable by the control unit 6. The pumping device comprises for example at least two electrically-operated sampling valves 17a, 17b, each electrically-operated valve 17a, 17b being connected to a distinct intermediate stage of the turbomolecular vacuum pump 9 so that the sampling flow rate can be adapted to suit the level of leaks, the electrically-operated sampling valve 17a, 17b being connected to a bypass of the vacuum line 7 arranged between the detection inlet 2 and the second electrically-operated isolation valve 14.

The pressure sensor 5 is configured to measure the pressure in the vacuum line 7, the vacuum line 7 comprising pipes placing the at least one electrically-operated sampling valve 17a, 17b, the second electrically-operated isolation valve 14 and the detection inlet 2 in communication.

The control unit 6 comprises one or more controllers or microcontrollers or processors, comprising memories and programs designed notably to command the opening of the electrically-operated valves 17a, 17b, 13, 14, 11. The control unit 6 is also able to manage a user interface of the leak detector 1, such as a remote control and/or a control panel.

According to one embodiment example, the control unit 6 is also configured to command the opening of the ultimate-vacuum electrically-operated valve 11 when the pressure measured by the pressure sensor 5 is below or equal to a low-pressure threshold so as to lower the ultimate-vacuum pressure of tracer gas in the rough-vacuum pump 8. The control unit 6 commands the closing of the ultimate-vacuum electrically-operated valve 11 when the pressure measured by the pressure sensor 5 is above the low-pressure threshold.

By lowering the ultimate-vacuum pressure in the rough-vacuum pump 8, the background noise of helium or hydrogen tracer gas in the gas detector 4 is lowered. Reducing the tracer gas background noise makes it possible to increase the leak detection sensitivity, notably by around 30%. Furthermore, the ability to obtain low background noise allows the leak detector 1 to become operational quickly after detecting a large leak, thereby making it possible to reduce the waiting time between two detections.

The lowering of pressure in the rough-vacuum pump 8 also makes it possible to reduce the noise level of the rough-vacuum pump 8 significantly and to reduce its electrical power consumption.

In the first embodiment example of FIG. 1, the ancillary pumping means 10 comprises at least one ancillary pump 18, such as a diaphragm pump or a piston pump or a peristaltic pump. The ancillary pump 18 is able for example to obtain an ultimate-vacuum pressure of between 5000 Pa (or 50 mbar) and 20 000 Pa (or 200 mbar). The ancillary pump 18 has a small bulk, a low weight and a low cost, notably making it possible for the leak detector 1 to remain compact, transportable and at a cost that is kept under control.

The ancillary pumping means 10 may be connected to the intake 12 of the rough-vacuum pump 8 via the ultimate-vacuum electrically-operated valve 11. In that case, provision is made for example for the ancillary pumping means 10 to comprise two ancillary vacuum pumps 17, such as two diaphragm pumps, mounted in series.

According to another example, the ancillary pumping means 10 is connected to the delivery 16 of the rough-vacuum pump 8, before the nonreturn valve.

In the example depicted in FIG. 1, the ancillary pumping means 10 is connected to an inter-stage canal C1-C4 of the rough-vacuum pump 8, such as to the inter-stage canal C4 that connects the penultimate pumping stage T4 to the last pumping stage T5.

Connecting the ancillary pumping means 10 to the delivery 16 or in the high-pressure stages of the rough-vacuum pump 8, such as to the last inter-stage canal C4, makes it possible to be more effective in terms of noise reduction, by the order of around 1.5 dbA, and in terms of the reduction in electrical power consumption, by the order of around 250 W.

Connecting the ancillary pumping means 10 to an inter-stage canal C1-C4 and in particular to the last inter-stage canal C4 of the rough-vacuum pump 8 also makes it possible to increase the life of the rough-vacuum pump by evacuating condensable species from the rough-vacuum pump 8 into the ancillary pumping means 10. The rough-vacuum pump 8 is thus protected from potential attack by condensable vapors, such as water vapor, which may condense in the high-pressure stages of the rough-vacuum pump 8. All that is then required is for the ancillary pumping means 10 to be replaced when it becomes damaged, the ancillary pumping means 10 being simple to change and low in cost.

Furthermore, it is possible to benefit from the presence of a bypass on the inter-stage canal C4 in order also to connect a purge device 19 for purging the leak detector 1.

The purge device 19 is connected as a bypass to the ultimate-vacuum electrically-operated valve 11 on the inter-stage canal C4. The purge device 19 comprises for example an electrically-operated purge valve 20 controllable by the control unit 6 and interposed between the inter-stage canal C4 and a source of purge gas, such as nitrogen.

The purge device 19 allows a purge gas to be introduced between the pumping stages T4, T5 of the rough-vacuum pump 8 when the ancillary pumping means 10 is isolated from the inter-stage canal C4 by the closing of the ultimate-vacuum electrically-operated valve 11.

The injection of a purge gas, notably into the final pumping stage C4, makes it possible to encourage the evacuation of the tracer gas and of the condensable vapors that may have built up in this part of the rough-vacuum pump 8. Just one connector thus allows the inter-stage canal C4 to be connected, on the one hand, to the ancillary pumping means 10 and, on the other hand, to the purge device 19 in order either to lower the ultimate-vacuum pressure of tracer gas in the rough-vacuum pump 8 or to introduce a purge gas into the inter-stage canal C4.

One example of a leak detection method 100 for leak-testing objects that are to be tested by spraying tracer gas implemented in a leak detector 1 of FIG. 1 will now be described.

When the overall supply of the leak detector 1 is cut off, the electrically-operated valves 11, 13, 14, 17a, 17b and 20 are closed. The turbomolecular vacuum pump 9, the rough-vacuum pump 8 and the ancillary pump 18 are stopped. The pressure in the vacuum line 7 is atmospheric pressure.

Figure 2:
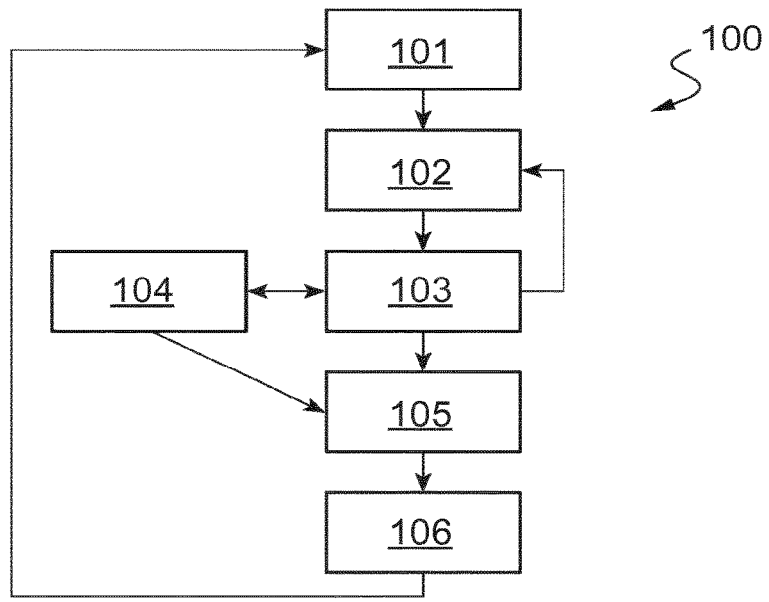
FIG. 2 depicts a flow diagram of a leak detection method for leak-testing objects that are to be tested by spraying tracer gas implemented in a leak detector such as that of FIG. 1.

Upon the starting-up of the leak detector 1 (FIG. 2: start-up step 101), when the user switches on the overall supply to the detector 1, the first electrically-operated isolation valve 13 is commanded to the open position. The rough-vacuum pump 8 and the turbomolecular vacuum pump 9 are switched on.

During this start-up step 101, it is also possible to command the opening of the ultimate-vacuum electrically-operated valve 11 and start the ancillary pump 18, in order to lower the pressure in the vacuum line 7 using the rough-vacuum pump 8 and the ancillary pump 18.

The use of the ancillary pumping means 10 in the phase of starting up the leak detector 1 allows a low pressure to be achieved more rapidly and assists in priming the pumping by the rough-vacuum pump 8. That makes it possible to accelerate the start-up phase. This start-up assistance is of particular benefit in the detection of leaks because the leak detector 1 generally needs to be switched on/off several times during the course of use. Specifically, the rotor of the turbomolecular vacuum pump 9 has to be stopped before the leak detector 1 can be moved on to another detection site, in order to avoid the risk of damaging the turbomolecular vacuum pump 9 as a result of the gyroscopic effect.

After a predetermined period of time has elapsed, the ultimate-vacuum electrically-operated valve 11 can be closed and the ancillary pump 18 switched off.

The leak detector 1 is ready for a measurement cycle.

When the user launches a measurement cycle, the second electrically-operated isolation valve 14 interposed between the detection inlet 2 and the intake 12 of the rough-vacuum pump 8 is opened (pre-evacuation step 102).

The pressure in the vacuum line 7 decreases.

According to one embodiment example, when the pressure measured in the vacuum line 7 is below or equal to a low-pressure threshold for example below or equal to 100 Pa (or 1 mbar), such as of the order of 50 Pa (or 0.5 mbar), the ultimate-vacuum electrically-operated valve 11 is commanded to open and, in this instance, the starting of the ancillary pump 18 is commanded in order to lower the ultimate-vacuum pressure in the rough-vacuum pump 8 using the ancillary pumping means 10. The opening of one of the electrically-operated sampling valves 17a, 17b is also commanded so as to place the turbomolecular vacuum pump 9 and the gas detector 4 in communication with the inlet of the detector 2 (detection step 103).

According to another embodiment example, the ancillary pump 18 is in constant operation and constantly lowers the ultimate-vacuum pressure in the rough-vacuum pump 8. In that case, the ultimate-vacuum electrically-operated valve 11 is always open or the leak detector 1 comprises no ultimate-vacuum electrically-operated valve 11.

The lowering of the ultimate-vacuum pressure in the rough-vacuum pump 8 using the ancillary pumping means makes it possible to lower the ultimate-vacuum pressure of tracer gas. The leak detector 1 is then ready to perform a spray leak test.

During the course of the test, the control unit 6 may switch over the electrically-operated sampling valve 17a, 17b according to the level of leakage of the object that is to be tested.

When the tracer gas concentration measured by the gas detector 4 is too great, a decision may be made to place the inter-stage canal C4 in communication with the purge device 19 rather than with the ancillary pumping means 10 so as to improve the evacuation of the tracer gas, by commanding the closing of the ultimate-vacuum electrically-operated valve 11 and the opening of the electrically-operated purge valve 20.

In the event of significant overpressure, namely when the pressure measured in the vacuum line 7 is above the low-pressure threshold, the ultimate-vacuum electrically-operated valve 11 is commanded to close and the ancillary pump 18 is stopped. The turbomolecular vacuum pump 9 is isolated from the detection inlet 2 by closing at least the at least one electrically-operated sampling valve 17a, 17b. The second electrically-operated isolation valve 14 is commanded to open (pre-evacuation step 102).

When the leak detector 1 is not being used for a period of time longer than a predefined period, a "standby" mode may be provided, in which mode the rotational speed of the rough-vacuum pump 8 is reduced (standby step 104). Reducing the rotational speed of the rough-vacuum pump 8 makes it possible to reduce the electrical power consumption of the leak detector 1 during periods of nonuse.

This mode can be triggered manually or can be detected and controlled by the control unit 6.

In this standby mode, the ultimate-vacuum electrically-operated valve 11 can be commanded to open in order to lower the ultimate-vacuum pressure in the rough-vacuum pump 8 using the ancillary pumping means 10 and thus reduce still further the electrical power consumption of the leak detector 1. The intake of the turbomolecular vacuum pump 9 is isolated by the closing of the at least one electrically-operated sampling valve 17a, 17b.

When the operator cuts off the overall supply to the leak detector 1, the electrically-operated valves 11, 13, 14, 17a, 17b and 20 close and the turbomolecular vacuum pump 9, the rough-vacuum pump 8 and the ancillary pump 18 stop (detector switch-off step 105).

Provision may be made for the ultimate-vacuum pressure in the rough-vacuum pump 8 to be lowered by the ancillary pumping means 10 for a predefined period of time after the cutting-off of the overall supply to the leak detector 1, by commanding the opening of the ultimate-vacuum electrically-operated valve 11 and, in this instance, by starting the ancillary pump 18 (restart step 106).

This restart may be performed just once after the switching-off of the leak detector 1, or cyclically. Cycles of "restarting" the leak detector 1 may thus be programmed by the control unit 6 after the leak detector 1 has been switched off, for example in the space of time during which the switched-off leak detector 1 is being moved around.

The supply of power to the ultimate-vacuum electrically-operated valve 11, to the control unit 6 and to the ancillary pump 18 may be furnished by a battery of the leak detector 1.

According to another example, this supply of power may be furnished by a kinetic energy recovery means of the leak detector 1, configured to recover the kinetic energy of rotation of the rotor of the turbomolecular vacuum pump 9 in the form of electrical energy and release it to power the control unit 6, the ultimate-vacuum electrically-operated valve 11 and the ancillary pump 18. Specifically, when the overall supply is cut off, the accumulated kinetic energy and the inertia mean that the rotor continues to turn. The motor M1 of the turbomolecular vacuum pump 9 can then be mechanically driven in rotation by the rotor, operating as a generator.

Such a power source specific to the detector 1, using a battery or using a kinetic energy recovery means, means that a supply of power for the ancillary pumping means can be maintained for long enough to allow the pressure in the rough-vacuum pump 9, which is then off, to lower. The rough-vacuum pump 8 can thus be "purged" of the tracer gas after use.

The leak detection method 100 thus makes it possible to reduce the tracer gas background noise using the ancillary pumping means 10, this making it possible to increase the measurement sensitivity and lower the waiting time between two measurements. The ancillary pumping means 10 also makes it possible to increase the life of the rough-vacuum pump 8 by making it more robust with respect to condensable species. The ancillary pumping means 10 may also be used to accelerate the creation of vacuum upon the start-up of the leak detector, something which may occur relatively frequently during a search for leaks. This same ancillary pumping means may also be used to reduce the electrical power consumption when the leak detector 1 is not in use and to purge the rough-vacuum pump 8 of the tracer gas and of the condensable vapors after the rough-vacuum pump 8 has been switched off.

In addition, the leak detection method 100 can be fully automated.

Figure 3:
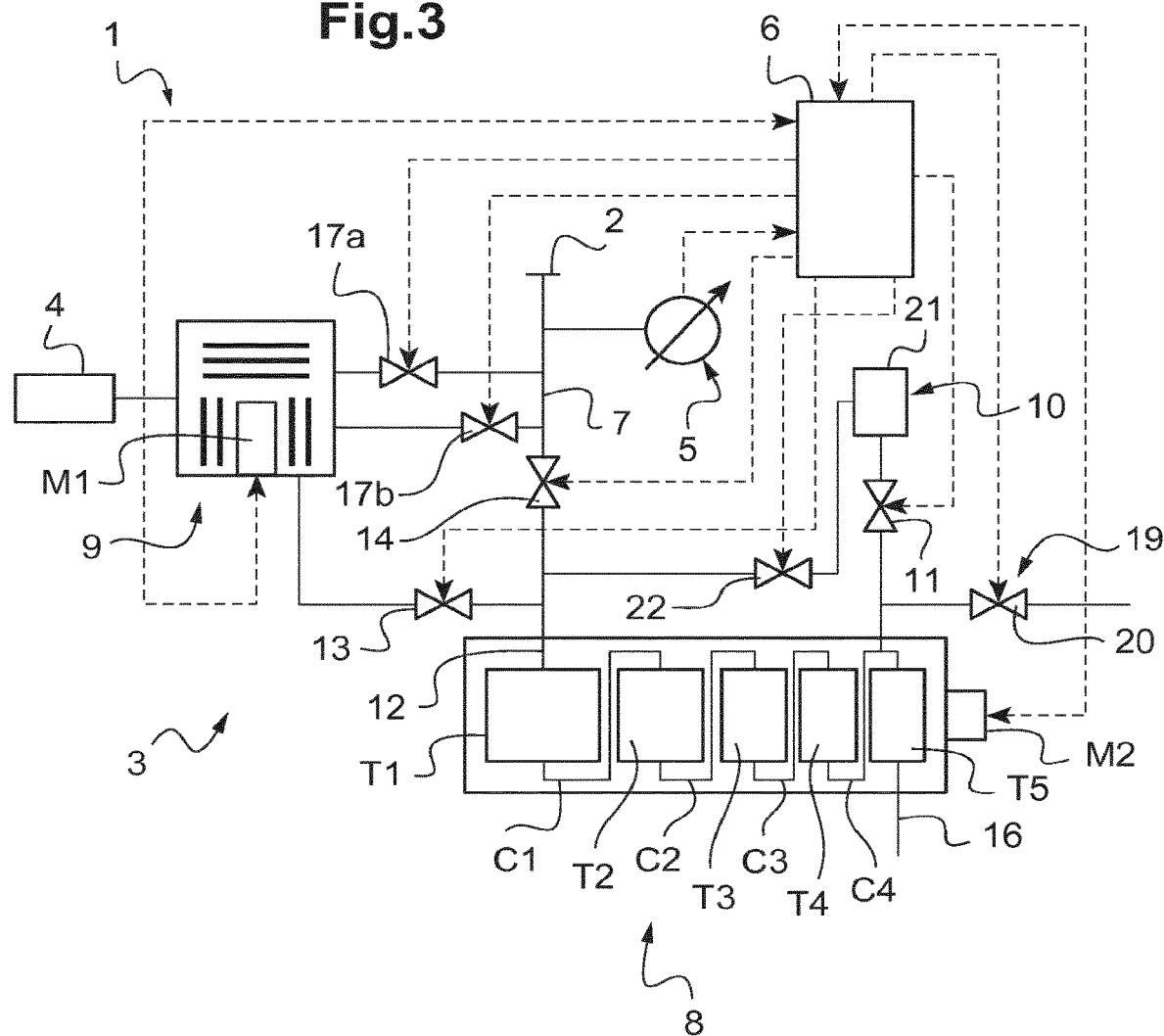
FIG. 3 shows a schematic view of a leak detector according to a second embodiment example.

FIG. 3 shows a second embodiment example.

In this second example, the ancillary pumping means 10 comprises a vacuum reservoir 21, an ultimate-vacuum electrically-operated valve 11 interposed between the vacuum reservoir 21 and the rough-vacuum pump 8, and a vacuum-creating electrically-operated valve 22 interposed between the vacuum reservoir 21 and the intake 12 of the rough-vacuum pump 8.

The ultimate-vacuum electrically-operated valve 11 and vacuum-creating electrically-operated valve 22 are controllable by the control unit 6.

The vacuum reservoir 21 is small in size, representing for example between 100 cm$^3$ and 500 cm$^3$, and of negligible weight and cost, allowing the leak detector 1 to remain compact, transportable, and at a cost that is kept under control.

The ancillary pumping means 10 may be connected to the delivery 16 of the rough-vacuum pump 8, before the non-return valve, or to an inter-stage canal C1-C4 of the rough-vacuum pump 8, such as to the inter-stage canal C4 that connects the penultimate pumping stage T4 to the final pumping stage T5.

When the overall supply to the leak detector 1 is cut off, the electrically-operated valves 11, 13, 14, 17a, 17b, 20 and 22 are closed. The turbomolecular vacuum pump 9 and the rough-vacuum pump 8 are stopped. The pressure in the vacuum line 7 and the vacuum reservoir 21 is atmospheric pressure.

When the leak detector 1 is started up (FIG. 2; start-up step 101), the first electrically-operated isolation valve 13 is commanded to open. The rough-vacuum pump 8 and the turbomolecular vacuum pump 9 are switched on.

The leak detector 1 is ready for a measurement cycle.

When the user launches a measurement cycle, the electrically-operated isolation valve 14 interposed between the detection inlet 2 and the intake 12 of the rough-vacuum pump 8 is opened, as is the vacuum-creating electrically-operated valve 22 (pre-evacuation step 102).

The pressure in the vacuum line 7 decreases.

When the pressure measured in the vacuum line 7 is below or equal to a low-pressure threshold for example lower than of equal to 100 Pa, such as of the order of 50 Pa, the vacuum-creating electrically-operated valve is closed and the ultimate-vacuum electrically-operated valve 11 is commanded to open, for example for a predetermined length of time of the order of a few seconds, in order to lower the ultimate-vacuum pressure in the rough-vacuum pump 8 using the ancillary pumping means 10. One of the electrically-operated sampling valves 17a, 17b is also commanded to open (detection step 103).

Upon the opening of the ultimate-vacuum electrically-operated valve 11, the pressure in the vacuum reservoir is of the order of the low-pressure threshold, thereby making it possible to lower the pressure in the rough-vacuum pump 8.

The lowering of the ultimate-vacuum pressure in the rough-vacuum pump 8 using the ancillary pumping means makes it possible to lower the ultimate-vacuum pressure of tracer gas.

The leak detector 1 is then ready to perform a spray leak test.

During the course of the test, the control unit 6 may switch over the electrically-operated sampling valve 17a, 17b according to the level of leaks in the object being tested.

When the tracer gas concentration measured by the gas detector 4 is too great, the decision may be taken to place the inter-stage canal C4 in communication with the purge device 19 rather than with the ancillary pumping means 10 so as to improve the evacuation of the tracer gas. While the rough-vacuum pump 8 is being purged, the ultimate-vacuum electrically-operated valve 11 is commanded to close. It is therefore possible to benefit from this to open the vacuum-creating electrically-operated valve 22 and thus again reduce the pressure in the vacuum reservoir 21.

In the event of significant overpressure, namely when the pressure measured in the vacuum line 7 is above the low-pressure threshold, the ultimate-vacuum electrically-operated valve 11 is commanded to close.

The turbomolecular vacuum pump 9 is isolated by closing at least the at least one electrically-operated sampling valve 17a, 17b. The second electrically-operated isolation valve 14 and the vacuum-creating electrically-operated valve 22 are commanded to open (pre-evacuation step 102).

When the leak detector 1 is not used for a period of time longer than a predefined length of time it is possible, as in the first embodiment example, to provide a "standby" mode in which the rotational speed of the rough-vacuum pump 8 is reduced (standby step 104) and in which it is possible to command the ultimate-vacuum electrically-operated valve 11 to open. If the vacuum reservoir 21 is at a low pressure, that means that the ultimate-vacuum pressure in the rough-vacuum pump 8 can be lowered, thereby reducing the electrical power consumption of the leak detector 1.

When the operator cuts off the overall supply to the leak detector 1, the electrically-operated valves 11, 13, 14, 17a, 17b, 21 and 22 close and the turbomolecular vacuum pump 9 and the rough-vacuum pump 8 switch off (detector switch-off step 105).

As in the first embodiment example, provision may be made to command the opening of the ultimate-vacuum electrically-operated valve 11 for a predefined length of time after the overall supply to the leak detector 1 has been cut off (restart step 106), the supply of power to the ultimate-vacuum electrically-operated valve 11 and the control unit 6 being furnished by a battery or by a kinetic energy recovery means of the leak detector 1. If the vacuum reservoir 21 is at low pressure, that allows the ultimate-vacuum pressure in the rough-vacuum pump 8 to be lowered and thus allows the switched-off rough-vacuum pump 8 to be purged.

The invention claimed is:

1. A leak detector for leak-testing objects that are to be tested by spraying tracer gas, the leak detector comprising:
    a detection inlet configured to be connected to an object that is to be tested,
    a pumping device comprising:
        a vacuum line connected to the detection inlet,
        a rough-vacuum pump connected to the vacuum line, and
        a turbomolecular vacuum pump connected to the vacuum line, a delivery of which is connected to the rough-vacuum pump; and
    a gas detector connected to the turbomolecular vacuum pump,
    wherein the pumping device further comprises an ancillary pumping means connected to the rough-vacuum pump and being configured to lower an ultimate-vacuum pressure of tracer gas in the rough-vacuum pump, and
    wherein the rough-vacuum pump comprises a plurality of pumping stages mounted in series, the ancillary pumping means being connected to an inter-stage canal of the rough-vacuum pump.

2. The leak detector according to claim 1, further comprising:

a pressure sensor configured to measure a pressure in the vacuum line; and a control unit connected to the pressure sensor, wherein the pumping device further comprises an ultimate-vacuum electrically-operated valve controllable by the control unit, the ultimate-vacuum electrically-operated valve connecting the ancillary pumping means to the rough-vacuum pump, the control unit being further configured to command an opening of the ultimate-vacuum electrically-operated valve when a pressure measured by the pressure sensor is below or equal to a low-pressure threshold.

3. The leak detector according to claim 2, the leak detector further comprising a purge device connected as a bypass of the ultimate-vacuum electrically-operated valve on the inter-stage canal.

4. The leak detector according to claim 2, wherein the inter-stage canal connects a penultimate pumping stage among the plurality of pumping stages of the rough-vacuum pump to a last pumping stage among the plurality of pumping stages of the rough-vacuum pump, the leak detector further comprising a purge device connected as a bypass of the ultimate-vacuum electrically-operated valve on the inter-stage canal.

5. The leak detector according to claim 1, wherein the inter-stage canal connects a penultimate pumping stage among the plurality of pumping stages of the rough-vacuum pump to a last pumping stage among the plurality of pumping stages of the rough-vacuum pump.

6. The leak detector according to claim 1, wherein the ancillary pumping means comprises at least one ancillary pump.

7. The leak detector according to claim 6, wherein the at least one ancillary pump is a diaphragm pump.

8. The leak detector according to claim 1, wherein the ancillary pumping means comprises a vacuum reservoir, an ultimate-vacuum electrically-operated valve interposed between the vacuum reservoir and the rough-vacuum pump, and a vacuum-creating electrically-operated valve interposed between the vacuum reservoir and an intake of the rough-vacuum pump, the ultimate-vacuum electrically-operated valve and the vacuum-creating electrically-operated valve being controllable by a control unit of the leak detector.

9. A leak detection method for leak-testing objects that are to be tested by spraying tracer gas, which is implemented in a leak detector according to claim 1, wherein the ultimate-vacuum pressure of the tracer gas in the rough-vacuum pump is lowered using the ancillary pumping means.

10. The leak detection method according to claim 9, wherein an opening of an ultimate-vacuum electrically-operated valve connecting the ancillary pumping means to the rough-vacuum pump is commanded in order to lower the ultimate-vacuum pressure of the tracer gas in the rough-vacuum pump using the ancillary pumping means when a pressure measured in the vacuum line is below or equal to a low-pressure threshold below or equal to 100 Pa.

11. The leak detection method according to claim 9, wherein an opening of an ultimate-vacuum electrically-operated valve connecting the ancillary pumping means to the rough-vacuum pump is commanded in order to lower the ultimate-vacuum pressure of the tracer gas in the rough-vacuum pump using the ancillary pumping means when a pressure measured in the vacuum line is below or equal to a low-pressure threshold below or equal to 50 Pa.

12. The leak detection method according to claim 9, wherein upon a start-up of the leak detector a pressure in the vacuum line is lowered using the rough-vacuum pump and using an ancillary pump of the ancillary pumping means.

13. The leak detection method according to claim 9, wherein an opening of an ultimate-vacuum electrically-operated valve connecting the ancillary pumping means to the rough-vacuum pump is commanded in order to lower the ultimate-vacuum pressure of the tracer gas in the rough-vacuum pump using the ancillary pumping means when a pressure measured in the vacuum line is below or equal to a low-pressure threshold below or equal to 100 Pa, and wherein a rotation speed of the rough-vacuum pump is reduced when the leak detector is not used for a period of time longer than a predefined period and an opening of the ultimate-vacuum electrically-operated valve is commanded.

14. The leak detection method according to claim 9, wherein an opening of an ultimate-vacuum electrically-operated valve connecting the ancillary pumping means to the rough-vacuum pump is commanded in order to lower the ultimate-vacuum pressure of the tracer gas in the rough-vacuum pump using the ancillary pumping means when a pressure measured in the vacuum line is below or equal to a low-pressure threshold below or equal to 50 Pa, and wherein a rotation speed of the rough-vacuum pump is reduced when the leak detector is not used for a period of time longer than a predefined period and an opening of the ultimate-vacuum electrically-operated valve is commanded.

15. The leak detection method according to claim 9, wherein the ultimate-vacuum pressure in the rough-vacuum pup is lowered using the ancillary pumping means for a predefined period of time after an overall supply of power to the leak detector is cut off, a supply of power being furnished by a battery of the leak detector or by a kinetic energy recovery means of the leak detector being configured to recover kinetic energy of rotation of a rotor of the turbomolecular vacuum pump in a form of electrical energy.

* * * * *